US010012867B2

(12) United States Patent
Chang

(10) Patent No.: US 10,012,867 B2
(45) Date of Patent: Jul. 3, 2018

(54) LIQUID CRYSTAL DEVICES (LCDS) AND THE BACKLIGHT MODULES THEREOF

(71) Applicant: Shenzhen China Star Optoelectronics Technology Co., Ltd., Shenzhen, Guangdong (CN)

(72) Inventor: Jianyu Chang, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 407 days.

(21) Appl. No.: 14/893,930

(22) PCT Filed: Apr. 16, 2015

(86) PCT No.: PCT/CN2015/076728
§ 371 (c)(1),
(2) Date: Nov. 24, 2015

(87) PCT Pub. No.: WO2016/155042
PCT Pub. Date: Oct. 6, 2016

(65) Prior Publication Data
US 2018/0120636 A1 May 3, 2018

(30) Foreign Application Priority Data
Apr. 1, 2015 (CN) .......................... 2015 1 0152239

(51) Int. Cl.
*G02F 1/1335* (2006.01)
*G02F 1/35* (2006.01)
*G02F 1/1333* (2006.01)

(52) U.S. Cl.
CPC .. *G02F 1/133602* (2013.01); *G02F 1/133524* (2013.01); *G02F 1/133553* (2013.01);
(Continued)

(58) Field of Classification Search
CPC .... G02B 6/0028; G02B 6/001; G02B 6/0055; G02B 6/0096; G02B 6/0031;
(Continued)

(56) References Cited

U.S. PATENT DOCUMENTS 5,486,984 A * 1/1996 Miller .................. G02B 6/0008
362/147
9,116,273 B2 8/2015 Chen et al.
(Continued)

FOREIGN PATENT DOCUMENTS

CN 202432357 U 9/2012
CN 203453947 U 2/2014
(Continued)

*Primary Examiner* — Thoi Duong
(74) *Attorney, Agent, or Firm* — Andrew C. Cheng

(57) ABSTRACT

A liquid crystal device and the backlight module thereof are disclosed. The backlight module includes a back plate, at least one optical film, a plurality of optical fibers, and a reflector. The optical fibers are arranged to configure at least one light bar of the backlight module. The optical film and the back plate are spaced apart and opposite to each other to define a chamber for the light beams to be transmitted. The optical fibers positioned by the reflector are located at one lateral side of the chamber such that each of the optical fibers and the back plate form a predetermined inclined angle. In addition, the reflector is arranged at light-emitting locations of the optical fibers so as to adjust an emitting angle of the light beams entering the chamber. The back plate reflects the light beams irradiated on the back plate back to the optical film. The uniformity of the transmitted and mixed light beams is guaranteed when the backlight module is adopted in large-scale LCD.

14 Claims, 1 Drawing Sheet

(52) U.S. Cl.
CPC ............. *G02F 2001/13332* (2013.01); *G02F 2001/3505* (2013.01)

(58) Field of Classification Search
CPC .. G02B 6/0073; G02B 6/0046; G02B 6/0006;
G02B 6/0043; G02B 6/0053; G02B
6/0035; G02B 6/005; G02B 6/0066;
G02B 6/0021; G02B 6/0075; G02B 6/00;
G02B 6/0008; G02B 6/0011; G02B
6/002; G02B 6/0023; G02B 6/0088;
G02B 6/0091; G02B 6/10; G02B 6/0013;
G02B 6/0015; G02B 6/02; G02B 6/04;
G02B 27/0101; G02B 5/02; H01L
2924/12041; H01L 2924/12042; H01L
2224/04042; G02F 1/1335; G02F
1/133504; G02F 1/133615; G02F
1/133605; G02F 1/133553; G02F
1/133606; G02F 1/133524; G02F 1/1336;
G02F 1/133608; G02F 1/1313; G02F
2203/02; G02F 2001/133507; F21K 9/62
USPC ...... 362/97.1, 609, 558, 610, 556, 561, 615,
362/551, 97.2, 511, 553, 560, 633;
385/129, 123, 146, 31; 349/58, 61, 62,
349/65, 67
See application file for complete search history.

(56) References Cited

U.S. PATENT DOCUMENTS

| | | | |
|---|---|---|---|
| 2013/0235611 A1* | 9/2013 | Franklin | ................ G09F 13/04 |
| | | | 362/602 |
| 2014/0133176 A1 | 5/2014 | Hu et al. | |
| 2015/0234112 A1 | 8/2015 | Wang | |
| 2015/0323727 A1 | 11/2015 | Li et al. | |

FOREIGN PATENT DOCUMENTS

| | | |
|---|---|---|
| CN | 103883928 A | 6/2014 |
| JP | 2003167136 A | 6/2003 |
| TW | 201113605 A | 4/2011 |

* cited by examiner

LIQUID CRYSTAL DEVICES (LCDS) AND
THE BACKLIGHT MODULES THEREOF

BACKGROUND OF THE INVENTION

1. Field of the Invention

The present disclosure relates to liquid crystal display technology, and more particularly to a liquid crystal device (LCD) and the backlight module thereof.

2. Discussion of the Related Art

Backlight LCDs are formed by the display panel and the backlight module. The backlight LCD may include side-light type and direct-light type, which may be distinguished by the incident light position. With respect to the side-light type, the light source is arranged at the lateral side of the display panel. When the light beams enter the light guiding plate and the light guiding plate converts the line light source into uniform surface light source. With respect to the direct-light type, the light source in an array form is arranged in a back of the display panel. The optical film coverts the light beams into uniform surface light source. In addition, LEDs are widely adopted by the above backlight modules.

With the technology development, a newly light incident solution relates to a combination of the side-light type and the direct-light type. By configuring the air and the curve surface of the bottom of the back plate, the transmission and the mixture of the light beams are accomplished without adopting the light guiding plate. Nevertheless, such light incident solution only may be suitable for small-scale LCDs. The reason resides in that, with respect to the large-scale LCD, the farthest distance that the light beams are transmitted within the air is farther. The light beams cannot be transmitted to the farther distance only by configuring the curved surface of the bottom of the back plate. In addition, the uniformity of the transmitted and mixed light beams cannot be guaranteed. In addition, as the light beams are reflected multiple times within the air, the optical loss is serious, which does not conform to the energy conservation concept.

SUMMARY

The object of the invention is to provide liquid crystal device (LCD) and the backlight module thereof. With the configuration, the uniformity when the light beams are transmitted and mixed are guaranteed for the large-scale LCDs.

In one aspect, a backlight module includes: a back plate, at least one optical film, a plurality of optical fibers, a reflector, and at least one positioning component attached to the reflector, wherein the reflector is securely attached to the back plate, the positioning component comprising a plurality of press-fit holes with each of the optical fibers passing through one of the corresponding press-fit holes, the optical fibers are secured by the positioning component, and arranged along the same direction and spaced apart from each other to configure at least one light bar of the backlight module, light beams from lighting devices and sunlight can be transmitted by the optical fibers, the optical film and the back plate being spaced apart and opposite to each other to define a chamber for the light beams to be transmitted, the optical fibers positioned by the reflector being arranged at one lateral side of the chamber such that each of the optical fibers and the back plate form a predetermined inclined angle along a horizontal direction, the reflector being arranged at light-emitting locations of the optical fibers so as to adjust an emitting angle of the light beams entering the chamber, the back plate comprising a recessed and arc surface facing toward the optical film, and reflecting the light beams irradiated on the back plate back to the optical film.

Wherein the back plate includes a reflective sheet arranged on a surface facing toward the optical film.

Wherein the reflector is of a U-shaped or V-shaped structure, the optical fibers are arranged within a bottom of the U-shaped or the V-shaped structure, and an opening of the U-shaped reflector is the light-emitting location of the optical fibers.

Wherein the inclined angle formed by each of the optical fibers and the horizontal direction of the back plate equals to 27 degrees.

In another aspect, a backlight module includes: a back plate, at least one optical film, a plurality of optical fibers, and a reflector, the optical fibers being arranged along the same direction and spaced apart from each other to configure at least one light bar of the backlight module, the optical film and the back plate being spaced apart and opposite to each other to define a chamber for the light beams to be transmitted, the optical fibers positioned by the reflector being arranged at one lateral side of the chamber such that each of the optical fibers and the back plate form a predetermined inclined angle along a horizontal direction, the reflector being arranged at light-emitting locations of the optical fibers so as to adjust an emitting angle of the light beams entering the chamber, the back plate comprising a recessed and arc surface facing toward the optical film, and reflecting the light beams irradiated on the back plate back to the optical film.

Wherein the light beams transmitted by the optical fibers includes the light beams from lighting devices and sunlight.

Wherein the back plate includes a recessed and arc surface facing toward the optical film.

Wherein the surface of the back plate facing toward the optical film is parallel to the optical film.

Wherein the back plate includes a reflective sheet arranged on a surface facing toward the optical film.

Wherein the reflector is of a U-shaped or V-shaped structure, the optical fibers are arranged within a bottom of the U-shaped or the V-shaped structure, and an opening of the U-shaped reflector is the light-emitting location of the optical fibers.

Wherein the inclined angle formed by each of the optical fibers and the horizontal direction of the back plate equals to 27 degrees.

Wherein the backlight module further comprises at least one positioning component attached to the reflector, wherein the reflector is securely attached to the back plate, the positioning component comprising a plurality of press-fit holes with each of the optical fibers passing through one of the corresponding press-fit holes, the optical fibers are secured by the positioning component.

In another aspect, a liquid crystal device (LCD) includes a display panel and any one of the above backlight module, and the display panel is arranged on the backlight module-.

Wherein the LCD further includes a front frame compressing the display panel on the reflector.

In view of the above, by adopting the optical fibers, a variety of light sources emitting light beams may be selected, which may include, but not limited to, the commonly used LEDs. For instance, the optical fibers may transmit the light beams from the sunlight. In addition, the reflector may be configured so as to adjust the emitting angle of the light beams. As such, the light beams may be transmitted to the farther distance without being reflected multiple times. Thus, the uniformity of the transmitted and mixed light beams is guaranteed, which contributes to the development of the large-scale dimension. In addition, as the light beams have not to be reflected multiple times, which can enhance the optical loss. In this way, the energy conservation concept may be satisfied.

DETAILED DESCRIPTION OF THE EMBODIMENTS

Embodiments of the invention will now be described more fully hereinafter with reference to the accompanying drawings, in which embodiments of the invention are shown.

Figure 1:
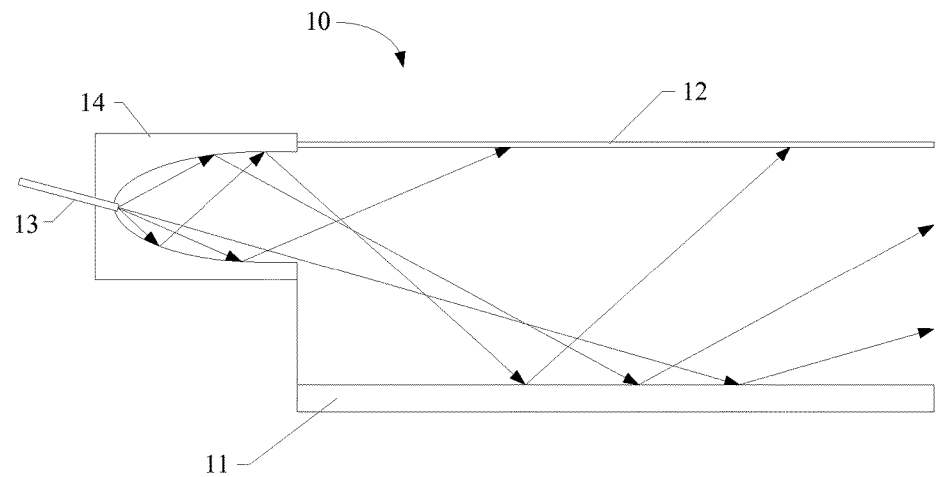
FIG. 1 is a cross-sectional view of the backlight module in accordance with one embodiment.

FIG. 1 is a cross-sectional view of the backlight module in accordance with one embodiment. As shown in FIG. 1, the backlight module 10 may be a combinative solution of the Side-light type and Direct-light type. The backlight module 10 includes a back plate 11, at least one optical film 12, a plurality of optical fibers 13, and a reflector 14. The optical fibers 13 are arranged along the same direction, that is, the lateral direction of the backlight module 10. The optical fibers 13 are spaced apart from each other. The optical fibers 13 constitute light bars (light sources) of the backlight module 10 for transmitting the light beams. The least one optical film 12 and the back plate 11 are spaced apart and are opposite to each other to define a chamber for the light beams to be transmitted therein.

The reflector 14 positions the optical fibers 13 at one lateral side of the chamber such that each of the optical fibers 13 and the back plate 11 form a predetermined inclined angle along the horizontal direction. In addition, the reflector 14 is arranged at a light-emitting location of the optical fibers 13. As such, the angle of the light beams entering the chamber may be adjusted. The back plate 11 reflects the light beams irradiated on the back plate 11 to the least one optical film 12. After passing through the least one optical film 12, a uniform surface light source is formed.

By adopting the optical fibers 13, a variety of the light sources may be adopted in the backlight module 10, which is not limited to common used LEDs. For instance, the optical fibers 13 may transmit the light beams from the sunlight, which is more Eco friendly than conventional lighting equipment.

The predetermined inclined angle may be formed by the optical fibers 13 and the back plate 11 along the horizontal direction. The light beams are reflected a plurality of times within the reflector 14. When the light beams enter the chamber, the light beams have a light emitting angle. Thus, it is obvious that the reflector 14 may adjust the light emitting angle of the light beams. Comparing to the conventional technology, the light beams may transmit to a further distance without being reflected multiple times by the curve surface of the back plate 11. As such, when the light beams, after being transmitted and mixed, arrive the further location, the uniformity of the light beams is ensured, which contributes to the development of the large-scale LCDs. In addition, as the light beams are not reflected multiple times, the optical loss of the lighting devices may be decreased so as to conserve the energy.

The components of the backlight module 10 will be described hereinafter so as to illustrate the advantages when compared to the conventional technology.

Figure 2:
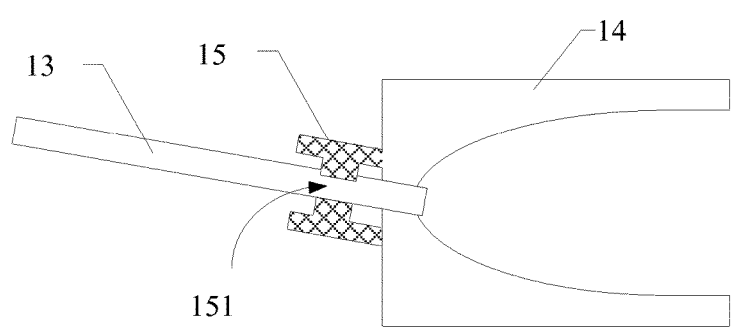
FIG. 2 is a cross-sectional view of the reflector and the fiber optics in accordance with one embodiment.

As shown in FIG. 1, the reflector 14 is securely attached to one lateral side of the reflector 14. The reflector 14 is a U-shaped strip. In another example, the reflector 14 may be V-shaped structure. The opening of the U-shaped reflector 14 may be the light-emitting location of the optical fibers 13. The optical fibers 13 are arranged in a bottom of the U-shaped reflector 14. The optical fibers 13 are arranged in a bottom of the U-shaped reflector 14. The optical fibers 13 may be attached to the bottom of the reflector 14 via adhesive tape or by adopting positioning components. Specifically, the reflector 14 includes a positioning component 15, as shown in FIG. 2. The positioning component 15 includes a plurality of press-fit holes. Each of the optical fibers 13 is configured to pass through one corresponding press-fit holes 151. By fastening the positioning component 15, the optical fibers 13 may be securely positioned.

Referring to FIG. 1, as each of the optical fibers 13 forms the predetermined inclined angle with the back plate 11 along the horizontal direction, a portion of the light beams emitted from the optical fibers 13 pass through a bottom half of the reflector 14 and then are reflected to the least one optical film 12. A portion of the light beams emitted from the optical fibers 13 pass through the top half of the reflector 14 and then are reflected to a surface of the back plate 11, and are reflected by the back plate 11 and then enter the least one optical film 12. A portion of the light beams emitted from the optical fibers 13 are reflected by the top half and bottom half of the reflector 14 and then enter the optical film 12 or arrive the surface of the back plate 11. A portion of the light beams emitted from the optical fibers 13 arrive the back plate 11, without being reflected by the reflector 14, and then are reflected by the back plate 11 so as to arrive the least one optical film 12.

The predetermined inclined angle may be selected in accordance with the dimension of the LCDs, that is, the farthest distance of the light beams. For instance, when the predetermined inclined angle equals to 27 degrees, the light beams transmitted by the optical fibers 13 is collimated. In addition, after being reflected by the reflector 14, it can be ensured that more light beams may be transmitted to the farthest distance. In addition, when the predetermined inclined angles are different, it can be understood that the light beams reflected to the least one optical film 12 may not include the above-mentioned four portions.

In addition, the edge area of the optical film 12 may be arranged on an extended portion of the reflector 14 or an extended portion of the back plate 11 facing toward the optical film 12.

The optical film 12 may be diffusion sheet, prism sheet, turning prism sheet, bright enhancement film (BEF), Dual Bright Enhancement Film (BEF), Diffused Reflective Polarizer Film (DRPF), or the combination of the above components.

In other embodiments, the backlight module 10 may be configured with the light guiding plate arranged within the chamber. That is, the backlight module 10 is clasped between the back plate 11 and the least one optical film 12. At this moment, the principles of the light reflection, transmission, and mixture of the backlight module 10 are the same with the above.

In the present disclosure, the LCD includes the display panel, a front frame and the above backlight module 10. The display panel is arranged at one side of the least one optical film 12 facing away the back plate 11. In addition, the display panel may be pressed on the plastic frame via the front frame. Alternatively, the display panel may be compressed on the extended portion of the back plate 11 facing toward the back plate 11 or be compressed on the reflector 14.

The LCD includes the advantages of the above backlight module 10.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module, comprising:
    a back plate, at least one optical film, a plurality of optical fibers, a reflector, and at least one positioning component attached to the reflector,
    wherein the reflector is securely attached to the back plate, the positioning component comprising a plurality of press-fit holes with each of the optical fibers passing through one of the corresponding press-fit holes, and the optical fibers being secured by the positioning component, arranged along the same direction, and spaced apart from each other to configure at least one light bar of the backlight module;
    wherein light beams from lighting devices and sunlight can be transmitted by the optical fibers,
        the optical film and the back plate being spaced apart and opposite to each other to define a chamber for the light beams to be transmitted, and
        the back plate comprising a recessed and arc surface facing toward the optical film, and reflecting the light beams irradiated on the back plate back to the optical film;
    and
    wherein the optical fibers are positioned by the reflector and arranged at one lateral side of the chamber such that each of the optical fibers and the back plate form a predetermined inclined angle along a horizontal direction, and the reflector is arranged at light-emitting locations of the optical fibers so as to adjust an emitting angle of the light beams entering the chamber.

2. The backlight module as claimed in claim 1, wherein the back plate comprises a reflective sheet arranged on a surface facing toward the optical film.

3. The backlight module as claimed in claim 1, wherein the reflector is of a U-shaped or V-shaped structure, the optical fibers are arranged within a bottom of the U-shaped or the V-shaped structure, and an opening of the U-shaped reflector is the light-emitting location of the optical fibers.

4. The backlight module as claimed in claim 3, wherein each of the optical fibers and the horizontal direction of the back plate forms the predetermined inclined angle equaling to 27 degrees.

5. A backlight module, comprising:
    a back plate, at least one optical film, a plurality of optical fibers, and a reflector,
    the optical fibers being arranged along the same direction and spaced apart from each other to configure at least one light bar of the backlight module,
        the optical film and the back plate being spaced apart and opposite to each other to define a chamber for light beams to be transmitted, and
        the back plate comprising a recessed and arc surface facing toward the optical film, and reflecting the light beams irradiated on the back plate back to the optical film;
    wherein the optical fibers are positioned by the reflector and arranged at one lateral side of the chamber such that each of the optical fibers and the back plate form a predetermined inclined angle along a horizontal direction, and the reflector is arranged at light-emitting locations of the optical fibers so as to adjust an emitting angle of the light beams entering the chamber.

6. The backlight module as claimed in claim 5, wherein the light beams transmitted by the optical fibers comprises the light beams from lighting devices and sunlight.

7. The backlight module as claimed in claim 5, wherein the back plate comprises a recessed and arc surface facing toward the optical film.

8. The backlight module as claimed in claim 7, wherein the back plate comprises a reflective sheet arranged on a surface facing toward the optical film.

9. The backlight module as claimed in claim 5, wherein the surface of the back plate facing toward the optical film is parallel to the optical film.

10. The backlight module as claimed in claim 5, wherein the reflector is of a U-shaped or V-shaped structure, the optical fibers are arranged within a bottom of the U-shaped or the V-shaped structure, and an opening of the U-shaped reflector is the light-emitting location of the optical fibers.

11. The backlight module as claimed in claim 10, wherein each of the optical fibers and the horizontal direction of the back plate forms the predetermined inclined angle equaling to 27 degrees.

12. The backlight module as claimed in claim 5, wherein the backlight module further comprises at least one positioning component attached to the reflector, and
    wherein the reflector is securely attached to the back plate, the positioning component comprising a plurality of press-fit holes with each of the optical fibers passing through one of the corresponding press-fit holes, and the optical fibers being secured by the positioning component.

13. A liquid crystal device (LCD), comprising a display panel and the backlight module, and the display panel is arranged on the backlight module, wherein the backlight module comprises:
    a back plate, at least one optical film, a plurality of optical fibers, a reflector, and at least one positioning component attached to the reflector,
    wherein the reflector is securely attached to the back plate, the positioning component comprising a plurality of press-fit holes with each of the optical fibers passing through one of the corresponding press-fit holes, and the optical fibers being secured by the positioning component, and arranged along the same direction and spaced apart from each other to configure at least one light bar of the backlight module;
    wherein light beams from lighting devices and sunlight can be transmitted by the optical fibers,
        the optical film and the back plate being spaced apart and opposite to each other to define a chamber for the light beams to be transmitted, and the back plate comprising a recessed and arc surface facing toward the optical film, and reflecting the light beams irradiated on the back plate back to the optical film;
and
wherein the optical fibers are positioned by the reflector and arranged at one lateral side of the chamber such that each of the optical fibers and the back plate form a predetermined inclined angle along a horizontal direction, and the reflector is arranged at light-emitting locations of the optical fibers so as to adjust an emitting angle of the light beams entering the chamber.

14. The LCD as claimed in claim 13, wherein the LCD further comprises a front frame compressing the display panel on the reflector.

* * * * *